(12) United States Patent
Miyata

(10) Patent No.: US 8,785,544 B2
(45) Date of Patent: Jul. 22, 2014

(54) PRIMER COMPOSITION AND LAMINATE USING THE SAME

(75) Inventor: Akihiro Miyata, Kanagawa-ken (JP)

(73) Assignee: The Yokohama Rubber Co., Ltd. (JP)

( * ) Notice: Subject to any disclaimer, the term of this patent is extended or adjusted under 35 U.S.C. 154(b) by 224 days.

(21) Appl. No.: 13/221,712

(22) Filed: Aug. 30, 2011

(65) Prior Publication Data

US 2012/0064351 A1 Mar. 15, 2012

(30) Foreign Application Priority Data

Sep. 13, 2010 (JP) ................................. 2010-204265

(51) Int. Cl.
| | | |
|---|---|---|
| *C08L 75/00* | (2006.01) | |
| *C03C 17/30* | (2006.01) | |
| *C03C 17/32* | (2006.01) | |
| *C08K 3/04* | (2006.01) | |
| *C08K 5/544* | (2006.01) | |

(52) U.S. Cl.
CPC ............... *C03C 17/30* (2013.01); *C03C 17/322* (2013.01); *C08K 3/04* (2013.01); *C08K 5/544* (2013.01)
USPC ............................. 524/507; 524/356; 524/495

(58) Field of Classification Search
USPC .......................................... 524/356, 495, 507
See application file for complete search history.

(56) References Cited

U.S. PATENT DOCUMENTS

| | | |
|---|---|---|
| 4,963,614 A | 10/1990 | Ito et al. |
| 2008/0081194 A1 | 4/2008 | Yamauchi et al. |
| 2008/0236725 A1 | 10/2008 | Mahdi et al. |

FOREIGN PATENT DOCUMENTS

| | | |
|---|---|---|
| JP | 53-023335 | 3/1978 |
| JP | 02-145661 | 6/1990 |
| JP | 2005-154573 | 6/2005 |
| JP | 2008-105416 | 5/2008 |

*Primary Examiner* — Edward Cain
(74) *Attorney, Agent, or Firm* — Thorpe North & Western LLP

(57) ABSTRACT

A primer composition is provided that includes a reactant having an alkoxysilyl group, the reactant being obtained by reacting a polyisocyanate (I), an isocyanate group, and an alkoxysilane having a reactable functional group; a polyisocyanate (II); a polyurethane compound; a (meth) acrylic resin; and a solvent. In the primer composition, a molecular weight of the (meth) acrylic resin is from 15,000 to 150,000 and a weight ratio [(meth) acrylic resin/polyurethane compound] of the (meth) acrylic resin to the polyurethane compound is from 90/10 to 10/90. Additionally, a laminate is provided that includes an inorganic material and a primer layer obtained from the primer composition.

16 Claims, 4 Drawing Sheets

Table 1-1

| NV. | | | Comparative Examples | | | | | |
|---|---|---|---|---|---|---|---|---|
| | | | 1 | 2 | 3 | 4 | 5 | 6 |
| Solvent | | | 90 | 90 | 90 | 90 | 90 | 90 |
| Carbon black | | | 9 | 9 | | | | |
| Polyurethane compound | | | 3.0 | 3.0 | 3.0 | 3.0 | | 2.0 |
| (Meth) acrylic resin A | | | | | | | | |
| (Meth) acrylic resin B | | | | | | | 3.0 | |
| (Meth) acrylic resin C | | | | | | | | 1.0 |
| Reactant A | 40.0% | | 12 | | 12 | | 12 | 12 |
| Reactant B | 40.0% | | | 12 | | 12 | | |
| Reactant C | 40.0% | | 15 | 15 | 15 | 15 | 15 | 15 |
| Polyisocyanate (II) A | 60.0% | | 6 | | | 6 | 6 | 6 |
| Polyisocyanate (II) B | 60.0% | | | 6 | 6 | | | |
| Adhesive strength (initial) Hand peeling (milky glass) n=3 | Initial | 3D | CF | CF | CF | CF | CF | CF |
| | Heat resistance | 100°C 4W | CF | CF | CF | CF | CF | CF |
| | Moisture resistance | 60°C water 2W | CF | CF | CF | CF | CF | AF |
| | Low temperature adhesion expression | 5°C 1W | PS | PS | PS | PS | CF | CF |
| | S-UV | 2C | CF | CF | CF | CF | CF | CF |
| | | 3C | AF | AF | AF | AF | PS | AF |
| | Reapplicability | 5°C 2W | CF | CF | CF | CF | PF | PS |

FIG. 1a

Table 1-1

| NV. | | | | Comparative Examples | | | | | |
|---|---|---|---|---|---|---|---|---|---|
| | | | | 1 | 2 | 3 | 4 | 5 | 6 |
| Adhesive strength (60°C, 2W) Hand peeling (milky glass) n=3 | Initial | 3D | | CF | CF | CF | CF | CF | CF |
| | Heat resistance | 100°C | 4W | CF | CF | CF | CF | CF | CF |
| | Moisture resistance | 80°C water | 2W | CF | CF | CF | CF | CF | AF |
| | Low temperature adhesion expression | 5°C | 1W | PS | PS | PS | PS | CF | CF |
| | S-UV | 2C | | CF | CF | CF | CF | CF | CF |
| | | 3C | | AF | AF | AF | AF | PS | AF |
| | Reapplicability | 5°C | 2W | CF | CF | CF | CF | PF | PS |
| Adhesive strength (initial) Hand peeling (polycarbonate resin coated with silicone hard coat) n=3 | Initial | 3D | | CF | CF | CF | CF | CF | CF |
| | Heat resistance | 100°C | 4W | CF | CF | CF | CF | CF | CF |
| | Moisture resistance | 80°C water | 2W | CF | CF | CF | CF | CF | AF |
| | Low temperature adhesion expression | 5°C | 1W | PS | PS | PS | PS | CF | CF |
| | S-UV | 2C | | CF | CF | CF | CF | CF | CF |
| | | 3C | | AF | AF | AF | AF | PS | AF |
| | Reapplicability | 5°C | 2W | CF | CF | CF | CF | PF | PS |
| Adhesive strength (60°C, 2W) Hand peeling (polycarbonate resin coated with silicone hard coat) n=3 | Initial | 3D | | CF | CF | CF | CF | CF | CF |
| | Heat resistance | 100°C | 4W | CF | CF | CF | CF | CF | CF |
| | Moisture resistance | 80°C water | 2W | CF | CF | CF | CF | CF | AF |
| | Low temperature adhesion expression | 5°C | 1W | PS | PS | PS | PS | CF | CF |
| | S-UV | 2C | | CF | CF | CF | CF | CF | CF |
| | | 3C | | AF | AF | AF | AF | PS | AF |
| | Reapplicability | 5°C | 2W | CF | CF | CF | CF | PF | PS |

FIG. 1b

Table 1-2

| | | | 1 | 2 | 3 | 4 | 5 | 6 | 7 | 8 | 9 | 10 | 11 | 12 |
|---|---|---|---|---|---|---|---|---|---|---|---|---|---|---|
| NV. | | | 90 | 90 | 90 | 90 | 90 | 90 | 90 | 90 | 90 | 90 | 90 | 90 |
| Solvent | | | 9 | 9 | 9 | 9 | 9 | 9 | | | | | | |
| Carbon black | | | 2.5 | 2.5 | 2.0 | 2.0 | 1.0 | 1.0 | 2.5 | 2.5 | 2.0 | 2.0 | 1.0 | 1.0 |
| Polyurethane compound | | | 0.5 | | 1.0 | | 2.0 | | 0.5 | | 1.0 | | 2.0 | |
| (Meth)acrylic resin A | | | | 0.5 | | 1.0 | | 2.0 | | 0.5 | | 1.0 | | 2.0 |
| (Meth)acrylic resin B | | | | | | | | | | | | | | |
| (Meth)acrylic resin C | | | 12 | 12 | 12 | 12 | | | 12 | 12 | 12 | 12 | 12 | 12 |
| Reactant A | 40.0% | | | | | | | | | | | | | |
| Reactant B | 40.0% | | | | | | 12 | 12 | | | | | | |
| Reactant C | 40.0% | | 15 | 15 | 15 | 15 | 15 | 15 | 15 | 15 | 15 | 15 | 15 | 15 |
| Polyisocyanate (II) A | 60.0% | | 6 | 6 | 6 | 6 | 6 | 6 | | | | | | |
| Polyisocyanate (II) B | 60.0% | | | | | | | | 6 | 6 | 6 | 6 | 6 | 6 |
| Adhesive strength (initial) | Initial | 3D | CF | CF | CF | CF | CF | CF | CF | CF | CF | CF | CF | CF |
| | Heat resistance | 100°C 4W | CF | CF | CF | CF | CF | CF | CF | CF | CF | CF | CF | CF |
| | Moisture resistance | 80°C water 2W | CF | CF | CF | CF | CF | CF | CF | CF | CF | CF | CF | CF |
| | Low temperature adhesion expression | 5°C 1W | CF | CF | CF | CF | CF | CF | CF | CF | CF | CF | CF | CF |
| | s-UV | 2C | CF | CF | CF | CF | CF | CF | CF | CF | CF | CF | CF | CF |
| Hand peeling (milky glass) n=3 | | 3C | CF | CF | CF | CF | CF | CF | PS | PS | PS | PS | PS | PS |
| Reapplicability | | 5°C 2W | CF | CF | CF | CF | CF | CF | CF | CF | CF | CF | CF | CF |

PRIMER COMPOSITION AND LAMINATE USING THE SAME

PRIORITY CLAIM

Priority is claimed to Japan Patent Application Serial No. 2010-204265 filed on Sep. 13, 2010.

TECHNICAL FIELD

The present technology relates to a primer composition and a laminate using the same.

BACKGROUND ART

The present applicant has, to-date, proposed primer compositions including an aromatic polyisocyanate; a thermoplastic polyurethane resin; at least one type selected from chlorinated polyolefin and a vinylidene chloride copolymer; a polyurethane having an alkoxysilane at an end thereof; and an inert solvent in which the four constituents are dissolved (Japanese Unexamined Patent Application Publication No. S53-023335A). Additionally, the present applicant has proposed technology regarding adhesive strength with respect to glass and the like (Japanese Unexamined Patent Application Publication No. 2008-105416A, and Japanese Unexamined Patent Application Publication No. 2005-154573A). Moreover, Japanese Unexamined Patent Application No. H02-145661A proposes a primer composition for use on glass.

SUMMARY TECHNOLOGY

Technology However, the present inventors have discovered that when polyurethane is used as a film forming resin, there is room for enhancement of an adhesion expression rate at low temperatures with respect to inorganic materials such as sealing materials. Additionally, when the film forming resin is only an acrylic resin and an open time thereof is significantly increased, it is necessary to reapply the primer composition. The present inventors discovered a problem in that when reapplied, the adhesion expression properties of the primer composition are often uneven.

The present technology provides a primer composition having rapid adhesion expression rate at low temperatures with respect to inorganic materials and superior adhesion expression properties even when reapplied.

A primer composition includes a reactant having an alkoxysilyl group, the reactant being obtained by reacting a polyisocyanate (I) and an alkoxysilane having a functional group that is reactable with an isocyanate group; a polyisocyanate (II); a polyurethane compound; a (meth) acrylic resin; and a solvent. A molecular weight of the (meth) acrylic resin is from 15,000 to 150,000 and a weight ratio [(meth) acrylic resin/polyurethane compound] of the (meth) acrylic resin to the polyurethane compound is from 90/10 to 10/90. The present inventors discovered that such a primer composition has a rapid adhesion expression rate at low temperatures with respect to inorganic materials, has no need of reapplication when open time is increased, and has superior adhesion expression properties even when reapplied.

Specifically, the present technology provides the following 1 to 10.

1. A primer composition including a reactant having an alkoxysilyl group, the reactant being obtained by reacting a polyisocyanate (I) and an alkoxysilane having a functional group that is reactable with an isocyanate group; a polyisocyanate (II); a polyurethane compound; a (meth) acrylic resin; and a solvent; wherein a molecular weight of the (meth) acrylic resin is from 15,000 to 150,000, and a weight ratio [(meth) acrylic resin/polyurethane compound] of the (meth) acrylic resin to the polyurethane compound is from 90/10 to 10/90.

2. The primer composition described in 1, wherein the (meth) acrylic resin is one or two or more of a polymer obtained from a methyl methacrylate homopolymer; a methyl acrylate homopolymer; and a copolymer of at least two selected from the group consisting of methyl acrylate, methyl methacrylate, butyl acrylate, and butyl methacrylate.

3. The primer composition described in 1 or 2, wherein a content of the reactant is from 10 to 400 parts by mass per a total 100 parts by mass of the polyurethane compound and the (meth) acrylic resin.

4. The primer composition described in any of 1 to 3, wherein a content of the polyisocyanate (II) is from 30 to 300 parts by mass per the total 100 parts by mass of the polyurethane compound and the (meth) acrylic resin.

5. The primer composition described in any of 1 to 4, wherein a content ratio [reactant/polyisocyanate (II)] (mass ratio) of the reactant to the polyisocyanate (II) is from 10/90 to 90/10.

6. The primer composition described in any of 1 to 5, further including a carbon black.

7. The primer composition described in 6, wherein a content of the carbon black is from 3 to 100 parts by mass per a total 100 parts by mass of a solid content of the reactant, the polyisocyanate (II), the polyurethane compound, and the (meth) acrylic resin.

8. A laminate including an inorganic material and a primer layer obtained from the primer composition described in any of 1 to 7.

9. The laminate described in 8, wherein the inorganic material is glass or a silicone hard coat.

10. The laminate described in 8 or 9, further including a sealing material on the primer layer.

The primer composition of the present technology has a rapid adhesion expression rate at low temperatures with respect to inorganic materials and superior adhesion expression properties even when reapplied.

The laminate of the present technology has a rapid adhesion expression rate at low temperatures between the inorganic material and the primer layer and superior adhesion expression properties even when the primer composition of the present technology is reapplied.

BRIEF DESCRIPTION OF THE FIGURES

FIGS. 1a-2b include Table 1 which demonstrates results of comparative testing of various aspects of the current technology and conventional technology.

DETAILED DESCRIPTION

The present technology is described in detail below.

A primer composition of the present technology includes: a reactant having an alkoxysilyl group, the reactant being obtained by reacting a polyisocyanate (I) and an alkoxysilane having a functional group that is reactable with an isocyanate group; a polyisocyanate (II); a polyurethane compound; a (meth) acrylic resin; and a solvent; wherein a molecular weight of the (meth) acrylic resin is from 15,000 to 150,000, and a weight ratio [(meth) acrylic resin/polyurethane compound] of the (meth) acrylic resin to the polyurethane compound is from 90/10 to 10/90.

The primer composition of the present technology has rapid adhesion expression rate at low temperatures with respect to inorganic materials, has no need for reapplication of the primer composition, and has superior adhesion expression properties even when reapplied. In the present technology, examples of the adhesion expression properties include, for example, adhesion expression properties at low temperatures. Additionally, "adhesion expression properties" refers to the adhesion expression properties of at least one selected from the group consisting of between a primer, between a base material and the primer, and between the primer and an adhesive such as a sealing material.

A description of the reactant is given below. The reactant included in the primer composition of the present technology is a reaction product having an alkoxysilyl group that is obtained by reacting a polyisocyanate (I) and an alkoxysilane having a functional group that is reactable with an isocyanate group.

The reactant is not particularly limited so long as it is a reactant having an alkoxysilyl group that is obtained by reacting the polyisocyanate (I) and the alkoxysilane having the functional group that is reactable with an isocyanate group.

From the perspectives of having a rapid adhesion expression rate at low temperatures with respect to inorganic materials, having no need for reapplication, having superior adhesion expression properties even when reapplied, and having superior moisture resistance, the reactant preferably further includes an isocyanate group.

Examples of organic groups that the reactant can include other than the alkoxysilyl group include aliphatic hydrocarbon groups, cycloaliphatic hydrocarbon groups, aromatic hydrocarbon groups, and combinations thereof.

The reactant can include a hetero atom. Additionally, the reactant can further have, for example, an isocyanate group, an isocyanurate body skeleton, an adduct body-derived skeleton, a burette body-derived skeleton, a urethane bond, a thiourethane bond, and a urea bond (including NH—CO—NH and NH—CO—N).

Examples of the reactant are, for example, those expressed by Formula (I) below.

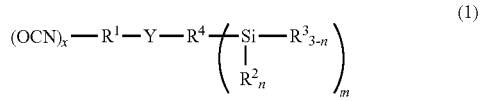

In the formula, $R^1$ is a residue of the polyisocyanate (I) from which the isocyanate group has been removed; Y is a group formed from the functional group that is reactable with an isocyanate group and the isocyanate group; $R^4$ is an organic group or a single bond; $R^2$ is an alkoxy group; $R^3$ is a hydrocarbon group; m is an integer from 1 to 4; n is an integer from 1 to 3; and x is an integer from 0 to 3.

$R^1$ is not particularly limited so long as it is a residue of the polyisocyanate (I) from which the isocyanate group has been removed. Examples thereof include aliphatic hydrocarbon groups (including open chain, branched chain, and cyclic), aromatic hydrocarbon groups, and combinations thereof. The residue can include, for example, a hetero atom such as an oxygen atom, a nitrogen atom, or a sulfur atom.

Examples of Y (group formed from the functional group that is reactable with an isocyanate group and the isocyanate group) include a urethane bond, a thiourethane bond, and a urea bond (including NH—CO—NH and NH—CO—N).

The organic group $R^4$ preferably has from 1 to 8 carbon atoms. Examples of the organic group include aliphatic hydrocarbon groups such as methylene groups, ethylene groups, trimethylene groups, tetramethylene groups, pentamethylene groups, hexamethylene groups, heptyl groups, and octyl groups; and aromatic hydrocarbon groups such as phenylene groups and xylylene groups.

The hydrocarbon group is not particularly limited. Examples thereof include alkyl groups such as methyl groups and ethyl groups; aromatic hydrocarbon groups such as phenyl groups; and combinations thereof.

m is preferably an integer from 1 to 3.

n is preferably an integer from 2 to 3.

x is preferably an integer from 0 to 2.

In the present technology, the reactant is obtained by reacting the polyisocyanate (I) and the alkoxysilane having a functional group that is reactable with an isocyanate group.

The polyisocyanate (I) used when producing the reactant is not particularly limited so long as it is a compound wherein two or more isocyanate groups are bonded. Examples thereof include aliphatic polyisocyanates (including open-chain aliphatic polyisocyanates and alicyclic polyisocyanates), aromatic polyisocyanates, isocyanurate bodies, adduct bodies, burette bodies, and urethane prepolymers.

Examples of the aliphatic polyisocyanate include hexamethylene diisocyanate (HDI), trimethylhexamethylene diisocyanate (TMHDI), lysine diisocyanate, norbornane diisocyanate methyl (NBDI), isophorone diisocyanate, hydrogenated xylylene diisocyanate, hydrogenated diphenylmethane diisocyanate, and dicyclohexylmethane diisocyanate.

Examples of the aromatic polyisocyanate include toluene diisocyanate (TDI), diphenylmethane diisocyanate, 1,4-phenylene diisocyanate, xylylene diisocyanate (XDI), tetramethylxylylene diisocyanate (TMXDI), tolidine diisocyanate (TODI), and 1,5-naphthalene diisocyanate (NDI).

Examples of the isocyanurate body include isocyanurates of tolylene diisocyanate and hexamethylene diisocyanate expressed by the following formula. Examples of commercially available product of this compound include Desmodur® HL.

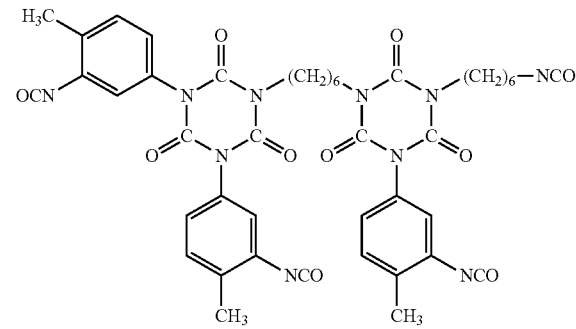

Examples of the adduct body include adduct bodies of toluene diisocyanate and trimethylolpropane expressed by the following formula. Examples of commercially available product of this compound include Desmodur® L.

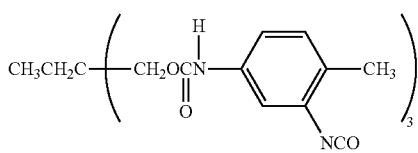

The urethane prepolymer is not particularly limited so long as it is obtained by reacting a polyisocyanate and a polyol. Examples of the polyol used when producing the urethane prepolymer include trimethylolpropane; polyoxyalkylene polyols such as polyoxypropylene glycol and polyoxypropylene triol; polyester polyol; polycarbonate polyol; polybutadiene polyol; and other polyols that can be used in the production of the urethane prepolymer. The polyisocyanate used in the production of the urethane prepolymer is not particularly limited so long as it is a compound having two or more isocyanate groups. Examples thereof are the same as for the polyisocyanate (I).

The alkoxysilane for use when producing the reactant is not particularly limited so long as it is a compound having a functional group that is reactable with an isocyanate group, and an alkoxysilyl group. Examples of the functional group that is reactable with an isocyanate group include amino groups, imino groups, mercapto groups, and hydroxy groups. The alkoxysilyl group is not particularly limited so long as at least one alkoxy group is bonded to the silicon atom. Examples thereof include monoalkoxysilyl groups, dialkoxysilyl groups, and trialkoxysilyl groups. Other than alkoxy groups, hydrocarbon groups may be used so long as they bond to the silicon atom. Examples thereof include aliphatic hydrocarbon groups (including open-chain, branched, and unsaturated bonded) such as methyl groups and ethyl groups; cycloaliphatic hydrocarbon groups such as cyclohexyl groups, aromatic hydrocarbon groups such as phenyl groups, and combinations thereof. Examples of the alkoxysilyl group include trimethoxysilyl groups, triethoxysilyl groups, dimethoxy methylsilyl groups, dimethoxy ethylsilyl groups, diethoxy methylsilyl groups, and diethoxy ethylsilyl groups.

Organic groups other than the functional group and the alkoxysilyl group that the alkoxysilane can include are not particularly limited. Examples thereof are the same as the organic groups included in the reactant. The functional group and the alkoxysilyl group can be bonded to the organic group.

Examples of the alkoxysilane include alkoxysilanes including secondary amines (imino groups) such as N,N-bis[(3-trimethoxysilyl)propyl]amine, N,N-bis[(3-triethoxysilyl)propyl]amine, N,N-bis[(3-tripropoxysilyl)propyl]amine, 3-(n-butylamino)propyltrimethoxysilane, 3-(n-propylamino)propyltrimethoxysilane, and N-phenyl-γ-aminopropyltrimethoxysilane; and alkoxysilanes including mercapto groups such as γ-mercaptopropyltrimethoxysilane, γ-mercaptopropyltriethoxysilane, γ-mercaptopropylmethyldimethoxysilane, γ-mercaptopropylmethyldiethoxysilane, and γ-mercaptopropylethyldiethoxysilane.

Specific examples of the reactant (combinations of the polyisocyanate (I) and the alkoxysilane) include reactants obtained by combining at least one type of polyisocyanate compound selected from the group consisting of an adduct body formed from 1,1,1-trimethylolpropane (TMP) and tolylene diisocyanate (TDI), an isocyanurate body obtained from HDI and TDI, and an additive formed from TMP and xylylene diisocyanate (XDI) with at least one type of alkoxysilane selected from the group consisting of N,N-bis[(3-trimethoxysilyl)propyl]amine, N,N-bis[(3-triethoxysilyl)propyl]amine, N,N-bis[(3-tripropoxysilyl)propyl]amine, 3-(n-butylamino)propyltrimethoxysilane, N-phenyl-γ-aminopropyltrimethoxysilane, 3-(n-propylamino)propyltrimethoxysilane, and 3-mercaptopropyltrimethoxysilane.

Among these, from the perspectives of having a rapid adhesion expression rate at low temperatures with respect to inorganic materials, having no need for reapplication, having superior adhesion expression properties even when reapplied, and having superior moisture resistance, the reactant is preferably obtained by reacting the adduct body formed from 1,1,1-trimethylolpropane (TMP) and tolylene diisocyanate (TDI) and/or the isocyanurate body obtained from HDI and TDI with N-phenyl-γ-aminopropyltrimethoxysilane and/or 3-mercaptopropyltrimethoxysilane.

A content ratio of the polyisocyanate (I) to the alkoxysilane can be set to 1 or greater in terms of isocyanate group/functional group (molar ratio). With the reactant, all of the isocyanate groups included in the polyisocyanate (I) may be reacted with the alkoxysilane. Alternatively, with the reactant, a portion of the isocyanate groups included in the polyisocyanate (I) may be reacted with the alkoxysilane.

A single reactant can be used or a combination of two or more reactants can be used.

When using a combination of two or more reactants, from the perspectives of having a rapid adhesion expression rate at low temperatures with respect to inorganic materials, having no need for reapplication, having superior adhesion expression properties even when reapplied, and having superior moisture resistance, preferably a combination of a compound (III) having one or more isocyanate group, from 1 to 3 alkoxysilyl groups, and at least one selected from the group consisting of a thiourethane bond, a urea bond, an adduct body skeleton, and a triisocyanurate skeleton; and a compound (IV) having 4 or more alkoxysilyl groups and at least one selected from the group consisting of a thiourethane bond, a urea bond, an adduct body skeleton, and a triisocyanurate skeleton. The compound (IV) may include an isocyanate group.

Specific examples of the compound (III) include a compound A obtained by reacting 3-mercaptopropyltrimethoxysilane and an HDI/TDI isocyanurate body at an NCO group/SH group ratio of 2/1 (molar ratio) (the compound A is an isocyanatesilane having two isocyanate groups, two alkoxysilyl groups, an isocyanurate skeleton and a thiourethane bond);

a compound B obtained by reacting 3-(N-phenyl)aminopropyltrimethoxysilane and an adduct body of toluene diisocyanate and trimethylolpropane at an NCO group/NH group ratio of 2/1 (molar ratio) (the compound B is a mixture of an isocyanatesilane having two isocyanate groups, one alkoxysilyl group, a urethane bond, and a urea bond and an isocyanatesilane having one isocyanate group, two alkoxysilyl groups, a urethane bond, and a urea bond).

Specific examples of the compound (IV) include a compound C obtained by reacting 3-mercaptopropyltrimethoxysilane and an HDI/TDI isocyanurate body at an NCO group/SH group ratio of 1/1 (molar ratio) (the compound C is a reactant having four alkoxysilyl groups, an isocyanurate skeleton and a thiourethane bond; the compound C does not include an isocyanate group).

From the perspectives of having a rapid adhesion expression rate at low temperatures with respect to inorganic materials, having no need for reapplication, having superior adhesion expression properties even when reapplied, and having superior moisture resistance, a combination of the compound (III) and the compound (IV) is preferably used for the reactant.

From the perspectives of having a rapid adhesion expression rate at low temperatures with respect to inorganic materials, having no need for reapplication, having superior adhesion expression properties even when reapplied, and having superior moisture resistance, a mass ratio of the compound (III) to the compound (IV) (compound A or B:compound C) is preferably from 10:1 to 1:10.

A reaction between the polyisocyanate (I) and the alkoxysilane is not particularly limited. For example, the reactant can be produced by mixing the polyisocyanate (I) and the alkoxysilane in a solvent and agitating under conditions from room temperature to about 40° C.

A description of the polyisocyanate (II) is given below. The polyisocyanate (II) included in the primer composition of the present technology is not particularly limited so long as it is a compound having two or more isocyanate groups. The polyisocyanate (II) is synonymous with the polyisocyanate (I) used in the production of the reactant.

Among these, from the perspectives of having a rapid adhesion expression rate at low temperatures with respect to inorganic materials, having no need for reapplication, having superior adhesion expression properties even when reapplied, and having superior moisture resistance, the polyisocyanate (II) is preferably an adduct body of 1,1,1-trimethylolpropane (TMP) and hexamethylene diisocyanate (HDI) or, alternatively, tolylene diisocyanate (TDI), or an isocyanurate body obtained from HDI and/or TDI.

A description of the polyurethane compound is given below. The polyurethane compound included in the primer composition of the present technology is not particularly limited so long as it is a compound having two or more urethane bonds. In the present technology, the polyurethane compound is used as a binder resin. The polyurethane compound can be configured so as to be usable as a binder resin, a film forming resin, or a film forming component in the primer composition. Examples thereof include thermoplastic polyurethane. Additionally, the polyurethane compound may be a urethane prepolymer. The urethane prepolymer is synonymous with the urethane prepolymer that can be used in the production of the reactant. Examples thereof include adipate-based polyester polyurethanes.

A description of the (meth) acrylic resin is given below. A molecular weight of the (meth) acrylic resin included in the primer composition of the present technology is from 15,000 to 150,000. When in this range, the primer composition of the present technology has a rapid adhesion expression rate at low temperatures with respect to inorganic materials, has no need for reapplication, has superior adhesion expression properties even when reapplied, and has superior solubility in the solvent. If the molecular weight of the (meth) acrylic resin exceeds 150,000, solubility in the solvent will be low, and effectiveness as a binder resin will decline. In the present technology, the molecular weight of the (meth) acrylic resin is a weight-average molecular weight expressed as a molecular weight of polystyrene, which is determined by gel permeation chromatography (GPC) using tetrahydrofuran (THF) as the solvent. From the perspectives of having a rapid adhesion expression rate at low temperatures with respect to inorganic materials, having no need for reapplication, having superior adhesion expression properties even when reapplied, and having superior moisture resistance, the weight-average molecular weight of the (meth) acrylic resin is preferably from 30,000 to 150,000, and more preferably from 50,000 to 150,000. In the present technology, the (meth) acrylic resin is used as a binder resin. Note that in the present technology, "(meth)acrylic resin" refers to an acrylic resin and/or a methacrylic resin.

A structure of the (meth) acrylic resin is not particularly limited. Examples thereof include homopolymers or copolymers of acrylic acid and esters thereof, and methacrylic acid and esters thereof. Specific examples include polymers, copolymers, and blends thereof using acrylic acid and methacrylic acid; (meth)acrylic acid alkyl esters such as methyl acrylate, ethyl acrylate, butyl acrylate, methyl methacrylate, ethyl methacrylate, and butyl methacrylate; hydroxyalkyl (meth)acrylates such as hydroxyethyl acrylate; (meth)acrylsilanes such as γ-methacryloxypropyltrimethoxysilane; and the like as a monomer. Monomers that are copolymerizable with the monomers described above (e.g. styrene-, acrylonitrile-, or diene-based monomers) can be used in addition to the monomers described above as the monomer for the (meth) acrylic resin.

Among these, from the perspectives of having a rapid adhesion expression rate at low temperatures with respect to inorganic materials, having no need for reapplication, having superior adhesion expression properties even when reapplied, and having superior moisture resistance, one or two or more of a methyl methacrylate homopolymer, a methyl acrylate homopolymer, and a copolymer obtained from at least two selected from the group consisting of methyl acrylate, methyl methacrylate, butyl acrylate, and butyl methacrylate are preferable.

An example of a preferable (meth) acrylic resin is one that is unmodified with a functional group such as an alkoxysilyl group, a carboxy group, or a hydroxy group. Such is preferable because workability will not decline due to increased viscosity that occurs as a result of increased molecular weight.

In the present technology, the weight ratio [(meth) acrylic resin/polyurethane compound] of the (meth) acrylic resin to the polyurethane compound is from 90/10 to 10/90. When in this range, the primer composition of the present technology has a rapid adhesion expression rate at low temperatures with respect to inorganic materials, has no need for reapplication, and has superior adhesion expression properties even when reapplied. From the perspectives of having a rapid adhesion expression rate at low temperatures with respect to inorganic materials, having no need for reapplication, and having superior adhesion expression properties even when reapplied, the weight ratio of the (meth) acrylic resin to the polyurethane compound is preferably from 70/30 to 30/70.

Here, from the perspectives of having a rapid adhesion expression rate at low temperatures with respect to inorganic materials, having no need for reapplication, and having superior adhesion expression properties even when reapplied, a content of the reactant is from 10 to 400 parts by mass and more preferably from 20 to 300 parts by mass per a total 100 parts by mass of the polyurethane compound and the (meth) acrylic resin.

Here, from the perspectives of having a rapid adhesion expression rate at low temperatures with respect to inorganic materials, having no need for reapplication, and having superior adhesion expression properties even when reapplied, a content of the polyisocyanate (II) is from 30 to 300 parts by mass and more preferably from 40 to 250 parts by mass per the total 100 parts by mass of the polyurethane compound and the (meth) acrylic resin.

From the perspectives of having a rapid adhesion expression rate at low temperatures with respect to both organic and inorganic materials, having no need for reapplication, and having superior adhesion expression properties even when reapplied, a weight ratio [reactant/polyisocyanate (II) (mass ratio)] of the reactant to the polyisocyanate (II) is preferably from 10/90 to 90/10 and more preferably from 20/80 to 80/20.

A description of the solvent is given below. The solvent included in the primer composition of the present technology is not particularly limited so long as it is inert with respect to the reactant, the polyisocyanate (II), the polyurethane compound, and the (meth) acrylic resin. Examples thereof include aromatic hydrocarbons such as benzene, xylene, toluene, and the like; ketones such as acetone, methyl ethyl ketone (MEK), methyl isobutyl ketone, and the like; esters such as methyl acetate, ethyl acetate, butyl acetate, and the like; and ethers such as diethylether, tetrahydrofuran, dioxane, and the like. Among these, ethyl acetate and MEK are preferable because they have low boiling points and the solubility of acrylic resin therein is excellent. A single solvent may be used alone or a combination of two or more solvents may be used.

A content of the solvent can be set to from 50 to 95 mass % in the composition.

The primer composition of the present technology can further include a carbon black. It is preferable that the primer composition of the present technology further includes the carbon black, because weatherability will be superior. The carbon black that is further included in the primer composition of the present technology is not particularly limited. Examples thereof include N110, N220, N330, N550, N770, and the like stipulated by the American Society for Testing and Materials, and mixtures thereof. A single carbon black can be used or a combination of two or more carbon blacks can be used.

From the perspectives of having a rapid adhesion expression rate at low temperatures with respect to inorganic materials and having superior weatherability, a content of the carbon black is preferably from 3 to 100 parts by mass and more preferably from 5 to 80 parts by mass per 100 parts by mass of a solid content of the primer composition excluding the carbon black (a total solid content of the solid contents of the reactant, the polyisocyanate (II), the polyurethane compound, and the (meth) acrylic resin is 100 parts by mass).

The primer composition of the present technology can further include other additives other than the constituents described above as necessary, so long as the object of the present technology is not inhibited. Examples of the additives include fillers, antiaging agents, antioxidants, antistatic agents, flame retardants, adhesive strengtheners, and dispersing agents. Each of the additives is not particularly limited.

The production of the primer composition of the present technology is not particularly limited. Examples thereof include a method wherein the reactant, the polyisocyanate (II), the polyurethane compound, the (meth) acrylic resin, and the carbon black and the additives that can be used as necessary, are mixed in the solvent using a roll, kneader, extruder, all-purpose mixer, or the like.

Examples of the base material (adherend) to which the primer composition of the present technology can be applied include inorganic materials, plastics, and rubbers.

The primer composition of the present technology has a rapid adhesion expression rate even at low temperatures of 5° C. or lower, has superior adhesive strength, has no need for reapplication of the primer composition, and has superior adhesion expression properties even when reapplied on a primer layer that is formed using the primer composition of the present technology.

The primer composition of the present technology can be used as a primer composition for adhering the base material to a sealing material. The sealing material is not particularly limited. Examples thereof include conventionally known products.

The primer composition of the present technology has a rapid adhesion expression rate at low temperatures with respect to inorganic materials, has high adhesion retention to the adherend after application, has no need of reapplication, and has superior adhesion expression properties even when reapplied. Particularly, the primer composition of the present technology has high adhesive strength (especially low-temperature adhesive strength) with respect to inorganic material adherends such as glass or silicone hard coats, and has a rapid adhesion rate.

Therefore, when used as a glass fixative sealant of a vehicle or the like, whether under high temperature conditions or low temperature conditions, the primer composition of the present technology is suitable as a primer composition for use on an inorganic material (glass or a silicone hard coat).

The primer composition of the present technology can be used on, for example, window glass of houses, buildings, and the like in addition to use on the glass of an automobile.

A description of the laminate of the present technology is given below.

The laminate of the present technology is a laminate that includes an inorganic material and a primer layer obtained from the primer composition of the present technology.

The primer composition used in the laminate of the present technology is not particularly limited so long as it is the primer composition of the present technology. Examples of the inorganic material used in the laminate of the present technology include glass, silicone hard coat, ceramic, mortar, concrete, porcelain, and metal.

The glass is not particularly limited. Examples of the glass that can be used include milky glass and resin glass that has been coated with a silicone hard coat.

When a silicone hard coat is used as the inorganic material, examples that can be used as a base material thereof include inorganic materials other than silicone hard coats, and organic materials such as plastic and rubber.

An example of a preferable form of the laminate of the present technology is one in which the laminate further includes a sealing material on the primer layer.

The sealing material used in the laminate of the present technology is not particularly limited. Examples thereof include urethane-based sealing materials, silicone-based sealing materials, and polysulfide-based sealing materials. Among these, polyurethane-based sealing materials are preferable because adhesive strength is superior.

Examples of configurations of the laminate of the present technology include:
inorganic material/the composition of the present technology/sealing material;
inorganic material/the composition of the present technology/sealing material/coating plate, metal, plastic, or rubber;
inorganic material or organic material/silicone hard coat/the composition of the present technology/sealing material; and
inorganic material or organic material/silicone hard coat/the composition of the present technology/sealing material/coating plate, metal, plastic, or rubber.

Working Examples

The present technology is described below in detail using working examples but the present technology is not limited to such working examples.

Production of the Primer Composition

Figure 2B:
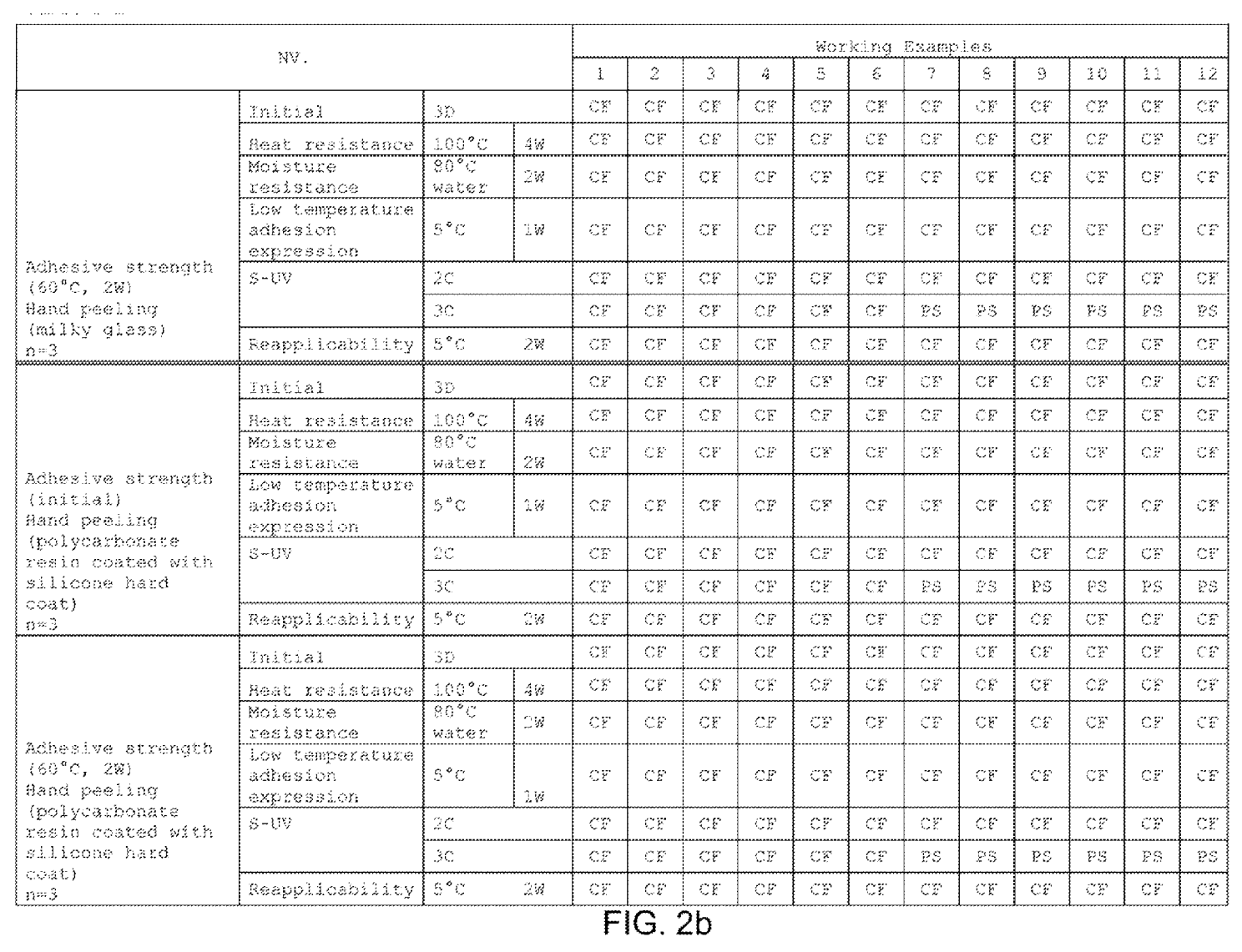

The primer composition was produced by mixing amounts (shown in Table 1 (i.e., Tables 1-1 and 1-2) in FIGS. 1a-2b) of the constituents (also shown in Table 1) at 20° C.

Evaluation

The primer composition obtained as described above was evaluated for adhesive strength according to the following method. The results are shown in Table 1.

Adhesive Strength

In the evaluation of adhesive strength, float glass (milky glass) or polycarbonate resin coated with a silicone hard coat was used as the adherend. A urethane-based sealing material (WS-222®, manufactured by Yokohama Rubber Co., Ltd.) was used as the sealing material.

A nonwoven fabric was used to apply the primer composition to the adherend and then the surface was dried for two minutes at 20° C. and 65% relative humidity. Next, the sealing material was applied on the primer layer and cured under the following conditions to obtain the laminate. Thus, evaluation results were recorded in Table 1 as the evaluated adhesive strength (initial) of the laminate obtained by drying the primer composition for two minutes at 20° C. and 65% relative humidity.

Additionally, the primer composition was left in a hermetically sealed state for two weeks at 60° C. and thereafter returned to room temperature. Then, a nonwoven fabric was used to apply the primer composition to the adherend and then the adherend was dried for two minutes at 20° C. and 65% relative humidity. Next, the sealing material was applied on the primer layer and cured under the following conditions to obtain the laminate. Thus, evaluation results were recorded in Table 1 as the evaluated adhesive strength (60° C., 2 W) of the laminate obtained by drying the primer composition for two minutes at 20° C. and 65% relative humidity after leaving the primer composition in a hermetically sealed state for two weeks at 60° C.

The obtained laminate was subjected to a peeling test via peeling by hand and the failure mode was visually observed.

Evaluation standards were as follows: Cohesive failure of the sealing material=CF; Peeling between the sealing material and the primer=PS; Peeling between the primer and the primer=PF; Peeling between the primer and the adherend=AF.

Initial 3 D: The laminate was cured for three days at 20° C. and 65% relative humidity.

Heat resistance 100° C., 4 W: Following the Initial 3 D described above, the laminate was left for four weeks at 100° C.

Moisture resistance 80° C. water, 2 W: Following the Initial 3 D described above, the laminate was left in 80° C. water for two weeks.

Low temperature adhesion expression 5° C., 1 W: The laminate was cured for one week at 5° C. and 50% relative humidity.

S-UV (weatherability) 2 C·3 C: Following the Initial 3 D described above, the laminate was irradiated with ultraviolet light (energy level=100 mJ/m$^2$; EYE Super UV Tester SUV-F11 (UV irradiation device), manufactured by Iwazaki Electric Co., Ltd.). Each cycle lasted 25 hours. The laminate subjected to two cycles was referred to as 2 C and the laminate subjected to three cycles was referred to as 3 C. Following irradiation, the peeling test was performed.

Reapplicability: The laminate was produced by applying the primer composition to the adherend, leaving the adherend for 14 days at 20° C. and 65% relative humidity, and then re-applying the same primer composition on the initial primer composition. After curing the laminate for two weeks at 5° C. and 50% relative humidity, a urethane-based sealing material was applied as the sealing material (WS-222®, manufactured by Yokohama Rubber Co., Ltd.) and was cured for three days at 20° C. and 65% relative humidity. Following curing, the peeling test was performed.

The components shown in Table 1 are as follows:

Solvent: Ethyl acetate

Carbon black: Carbon black

Polyurethane compound: Adipate-based thermoplastic polyester polyurethane; Pandex0 T5205, manufactured by DIC Bayer Polymer Ltd.; Solid content=100%

(Meth) acrylic resin A: Methyl methacrylate/methyl acrylate copolymer; Average molecular weight=100,000; Delpet® 80N, manufactured by Asahi Kasei Chemicals Corporation; Solid content=100%

(Meth) acrylic resin B: Methyl methacrylate/methyl acrylate copolymer; Average molecular weight=65,000; Delpet® 720V, manufactured by Asahi Kasei Chemicals Corporation; Solid content=100%

(Meth) acrylic resin C: Methyl methacrylate/butyl methacrylate/butyl acrylate copolymer; Average molecular weight=8,000; ARUFON® UP-1170, manufactured by Toagosei Co., Ltd.; Solid content=100%

Reactant A: A reactant obtained by reacting 3-mercaptopropyltrimethoxysilane (KBM-803, manufactured by Shin-Etsu Chemical Co., Ltd.) and an HDI/TDI isocyanurate body (Desmodur® HL, manufactured by Sumika Bayer Urethane Co., Ltd.; forming two isocyanurate rings and having four NCO groups per molecule) at an NCO group/SH group ratio of 2/1 (molar ratio); by agitating in ethyl acetate at 40° C. The obtained reactant is the reactant A. The reactant A is an isocyanatesilane having two isocyanate groups, two alkoxysilyl groups, an isocyanurate skeleton, and a thiourethane bond. Note that an ethyl acetate solution having a concentration of 40 mass % was used for the reactants A to C.

Reactant B: A reactant obtained by reacting 3-(N-phenyl) aminopropyltrimethoxysilane (Y-9669, manufactured by Momentive Performance Materials Inc.) and an adduct body of toluene diisocyanate and trimethylolpropane (Desmodur® L, manufactured by Sumika Bayer Urethane Co., Ltd.) at an NCO group/NH group ratio of 2/1 (molar ratio); by agitating in ethyl acetate at 40° C. The obtained reactant is the reactant B. The reactant B is a mixture of an isocyanatesilane having two isocyanate groups, one alkoxysilyl group, a urethane bond, and a urea bond and an isocyanatesilane having one isocyanate group, two alkoxysilyl groups, a urethane bond, and a urea bond.

Reactant C: A reactant was produced identical to the reactant A except for that the NCO group/SH group ratio (molar ratio) was changed to 1/1. The obtained reactant is the reactant C. The reactant C is a reactant having four alkoxysilyl groups, an isocyanurate skeleton, and a thiourethane bond; the compound C does not include an isocyanate group. The reactant C does not have an isocyanate group.

Polyisocyanate (II) A: Desmodur® L, manufactured by Sumika Bayer Urethane Co., Ltd.

Polyisocyanate (II) B: Desmodur® HL, manufactured by Sumika Bayer Urethane Co., Ltd.

Note that an ethyl acetate solution having a concentration of 60 mass % was used for the polyisocyanate (II) A and B.

As is clear from the results shown in Table 1, the adhesion rate at low temperatures of Comparative Examples 1 to 4, which did not include the (meth) acrylic resin, was slow and weatherability was inferior. The weatherability of Comparison Example 5, which did not include the polyurethane compound, was inferior and adhesion expression properties between the primers when the primer composition was reapplied were low. The moisture resistance of Comparison Example 6, wherein the molecular weight of the (meth) acrylic resin was less than 15,000, was inferior and adhesion expression properties between the primer and the sealing material when the primer composition was reapplied were low.

In contrast, Working Examples 1 to 12 displayed rapid adhesion expression rates at low temperatures with respect to inorganic materials and superior adhesion expression properties even when reapplied. Additionally, Working Examples 1 to 12 displayed superior moisture resistance, hot water resistance, heat resistance, and weatherability with regards to the adhesion thereof. The weatherability of Working Examples 1 to 6, in which the carbon black was included, was superior to the weatherability of Working Examples 7 to 12, in which the carbon black was not included.

What is claimed is:

1. A primer composition comprising:
   a reactant having an alkoxysilyl group, the reactant being obtained by reacting a polyisocyanate (I) and an alkoxysilane having a functional group that is reactable with an isocyanate group;
   a polyisocyanate (II);
   a polyurethane compound;
   a (meth) acrylic resin; and
   a solvent; wherein
   a molecular weight of the (meth) acrylic resin is from 15,000 to 150,000, and
   a weight ratio of the (meth) acrylic resin to the polyurethane compound is from 90/10 to 10/90.

2. The primer composition according to claim 1, wherein the (meth) acrylic resin is one or two or more of a polymer obtained from a methyl methacrylate homopolymer; a methyl acrylate homopolymer; and a copolymer of at least two selected from the group consisting of methyl acrylate, methyl methacrylate, butyl acrylate, and butyl methacrylate.

3. The primer composition according to claim 1, wherein a content of the reactant is from 10 to 400 parts by mass per a total 100 parts by mass of the polyurethane compound and the (meth) acrylic resin.

4. The primer composition according to claim 1, wherein a content of the polyisocyanate (II) is from 30 to 300 parts by mass per the total 100 parts by mass of the polyurethane compound and the (meth) acrylic resin.

5. The primer composition according to claim 1, wherein a content ratio of the reactant to the polyisocyanate (II) is from 10/90 to 90/10.

6. The primer composition according to claim 1, further comprising a carbon black.

7. The primer composition according to claim 6, wherein a content of the carbon black is from 3 to 100 parts by mass per a total 100 parts by mass of a solid content of the reactant, the polyisocyanate (II), the polyurethane compound, and the (meth) acrylic resin.

8. The primer composition according to claim 1, wherein the solvent comprises ethyl acetate or methyl ethyl ketone (MEK), and wherein the reactant comprises an isocyanate group and is obtained by mixing the polyisocyanate (I) and the alkoxysilane in the solvent and agitating under conditions from room temperature to about 40° C.

9. The primer composition according to claim 1, wherein the reactant is expressed by Formula (I):

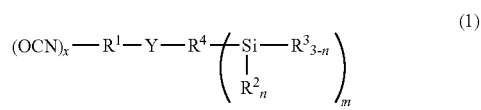

where $R^1$ is a residue of the polyisocyanate (I) from which an isocyanate group has been removed; Y is a group formed from a functional group that is reactable with an isocyanate group and the isocyanate group; $R^4$ is an organic group or a single bond; $R^2$ is an alkoxy group; $R^3$ is a hydrocarbon group; m is an integer from 1 to 4; n is an integer from 1 to 3; and x is an integer from 0 to 3.

10. The primer composition according to claim 9, wherein:
    the organic group $R^4$ has from 1 to 8 carbon atoms and includes one or more groups selected from methylene groups, ethylene groups, trimethylene groups, tetramethylene groups, pentamethylene groups, hexamethylene groups, heptyl groups, and octyl groups;
    the hydrocarbon group $R^3$ includes one or more groups selected from selected from methyl groups, ethyl groups, phenyl groups, and combinations thereof;
    m is an integer from 1 to 3;
    n is an integer from 2 to 3; and
    x is an integer from 0 to 2.

11. The primer composition according to claim 1, wherein the reactant is obtained by reacting an adduct body formed from 1,1,1-trimethylolpropane (TMP) and tolylene diisocyanate (TDI) and/or an isocyanurate body obtained from HDI and TDI with N-phenyl-γ-aminopropyltrimethoxysilane and/or 3-mercaptopropyltrimethoxysilane.

12. The primer composition according to claim 1, wherein the reactant comprises a combination of a plurality of reactants including: a compound (III) having one or more isocyanate groups, from 1 to 3 alkoxysilyl groups, and at least one selected from the group consisting of a thiourethane bond, a urea bond, an adduct body skeleton, and a triisocyanurate skeleton; and a compound (IV) having 4 or more alkoxysilyl groups and at least one selected from the group consisting of a thiourethane bond, a urea bond, an adduct body skeleton, and a triisocyanurate skeleton.

13. The primer composition according to claim 12, wherein a mass ratio of the compound (III) to the compound (IV) is from 10:1 to 1:10.

14. The primer composition according to claim 1, wherein the polyisocyanate (II) is an adduct body of 1,1,1-trimethylolpropane (TMP) and hexamethylene diisocyanate (HDI) or tolylene diisocyanate (TDI), or an isocyanurate body obtained from HDI and/or TDI.

15. The primer composition according to claim 1, wherein the molecular weight of the (meth) acrylic resin is from 50,000 to 150,000 and the weight ratio of the (meth) acrylic resin to the polyurethane compound is from 70/30 to 30/70.

16. The primer composition according to claim 1, further comprising a carbon black, and wherein:
    a content of the reactant is from 20 to 300 parts by mass per a total 100 parts by mass of the polyurethane compound and the (meth) acrylic resin;
    a content of the polyisocyanate (II) is from 40 to 250 parts by mass per the total 100 parts by mass of the polyurethane compound and the (meth) acrylic resin;
    a weight ratio (II) of the reactant to the polyisocyanate (II) is from 20/80 to 80/20; and
    a content of the carbon black is from 5 to 80 parts by mass per 100 parts by mass of a solid content of the primer composition excluding the carbon black.

* * * * *